US006988821B2

(12) United States Patent
Dray, Sr.

(10) Patent No.: US 6,988,821 B2
(45) Date of Patent: Jan. 24, 2006

(54) PLASTICS SCREW WITH BARRIER MEMBERS

(76) Inventor: Robert F. Dray, Sr., 6610 Mimosa, Dallas, TX (US) 75230

( * ) Notice: Subject to any disclaimer, the term of this patent is extended or adjusted under 35 U.S.C. 154(b) by 190 days.

(21) Appl. No.: 10/334,670

(22) Filed: Dec. 30, 2002

(65) Prior Publication Data

US 2004/0126453 A1 Jul. 1, 2004

(51) Int. Cl.
B29B 7/42 (2006.01)
(52) U.S. Cl. .............................. 366/81; 366/88; 366/89
(58) Field of Classification Search ............ 366/79–85, 366/88–90, 318–319, 322–324; 425/204, 425/208, 209
See application file for complete search history.

(56) References Cited

U.S. PATENT DOCUMENTS

| | | | | |
|---|---|---|---|---|
| 3,115,674 A | * | 12/1963 | Schrenk et al. ................ 366/81 |
| 3,358,327 A | * | 12/1967 | Maillefer ................. 425/378.1 |
| 3,368,724 A | * | 2/1968 | Reifenhauser et al. ........ 366/88 |
| 3,650,652 A | * | 3/1972 | Dray et al. ................. 425/208 |
| 3,671,021 A | * | 6/1972 | Pomper et al. ............... 366/89 |
| 3,687,423 A | * | 8/1972 | Koch et al. .................... 366/81 |
| 3,698,541 A | * | 10/1972 | Barr .......................... 425/208 |
| 3,701,512 A | * | 10/1972 | Heinz et al. ................... 366/81 |
| 3,858,856 A | * | 1/1975 | Hsu ............................. 366/88 |
| 3,866,890 A | * | 2/1975 | Tadmor et al. ................ 366/89 |
| RE28,901 E | * | 7/1976 | Kim .......................... 425/208 |
| 4,000,884 A | * | 1/1977 | Chung ......................... 366/88 |
| 4,092,015 A | * | 5/1978 | Koch .......................... 366/81 |
| 4,227,870 A | * | 10/1980 | Kim .......................... 425/208 |
| 4,341,474 A | * | 7/1982 | Wheeler et al. .............. 366/88 |
| 4,405,239 A | * | 9/1983 | Chung et al. ................. 366/89 |
| 4,723,847 A | | 2/1988 | Dray |
| 4,840,492 A | * | 6/1989 | Nakamura ................... 366/81 |
| 4,896,969 A | * | 1/1990 | Dray ........................... 366/88 |
| 4,944,906 A | * | 7/1990 | Colby et al. ................ 264/101 |
| 4,963,033 A | * | 10/1990 | Huber et al. ................. 366/81 |
| 5,033,860 A | * | 7/1991 | Nakamura ................... 366/89 |
| 5,071,255 A | | 12/1991 | Dray et al. |
| 5,141,326 A | * | 8/1992 | Eshima ........................ 366/88 |
| 5,573,331 A | * | 11/1996 | Lin ............................. 366/81 |
| 5,599,097 A | * | 2/1997 | Christie ....................... 366/88 |
| 6,017,145 A | * | 1/2000 | Jenkins et al. ............... 366/79 |
| 6,056,430 A | * | 5/2000 | Medici et al. ................ 366/88 |
| 6,139,179 A | * | 10/2000 | Christiano et al. ........... 366/80 |
| 6,176,606 B1 | * | 1/2001 | Thompson et al. .......... 366/88 |
| 6,672,753 B1 | * | 1/2004 | Womer et al. ................ 366/88 |
| 2004/0141406 A1 | * | 7/2004 | Womer et al. |
| 2004/0213077 A1 | * | 10/2004 | Dray |

FOREIGN PATENT DOCUMENTS

| | | | |
|---|---|---|---|
| DE | 2352816 A1 | * | 4/1975 |
| JP | 61-222706 | * | 10/1986 |
| JP | 11-70561 | * | 3/1999 |
| WO | 96/20821 | * | 7/1996 |

* cited by examiner

Primary Examiner—Charles E. Cooley
(74) Attorney, Agent, or Firm—Storm LLP

(57) ABSTRACT

A screw rotates in a containment barrel, and comprises a shaft having an upstream end and a downstream end At least one flight is secured to the surface of the shaft and extends helically in successive turns around the circumference of the shaft. An upstream barrier member extends radially from the surface of the shaft and generally transversely between successive turns of the flight. The upstream barrier is disposed proximal the upstream end of the shaft. A downstream barrier member extends radially from the surface of the shaft and generally transversely between successive turns of the flight. The downstream barrier is disposed proximal the downstream end of the shaft.

10 Claims, 3 Drawing Sheets

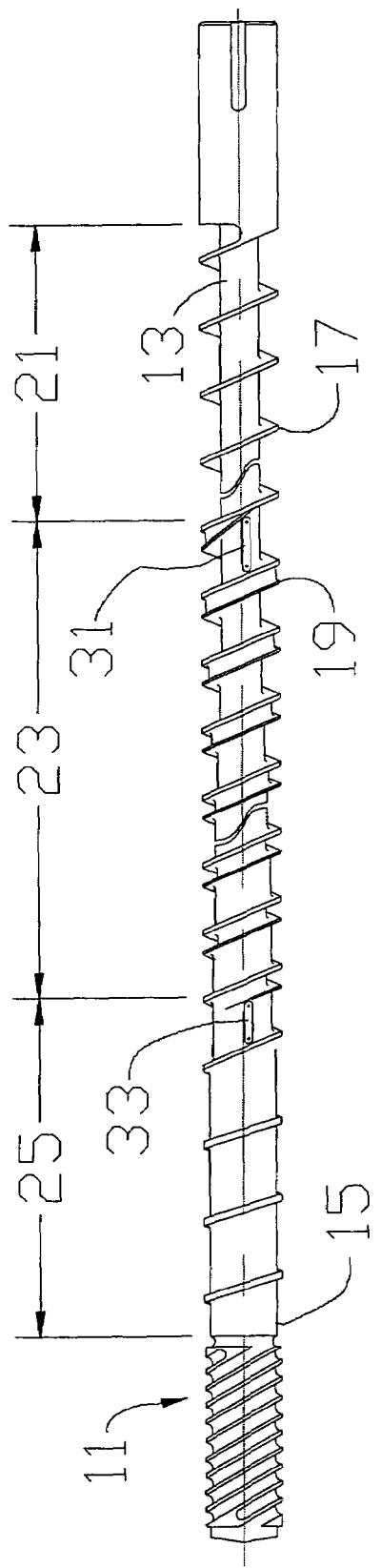
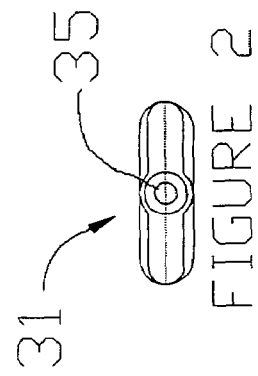
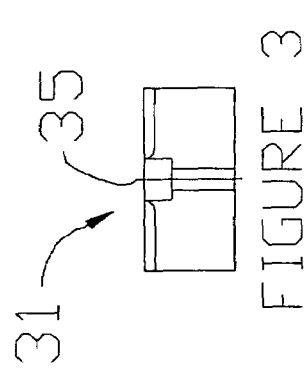
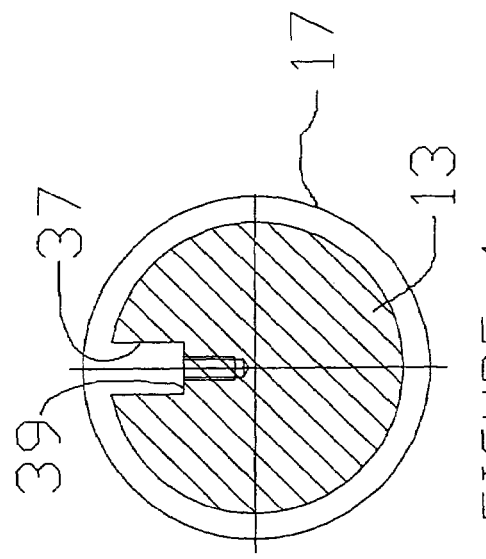
FIGURE 1
FIGURE 2
FIGURE 3
FIGURE 4

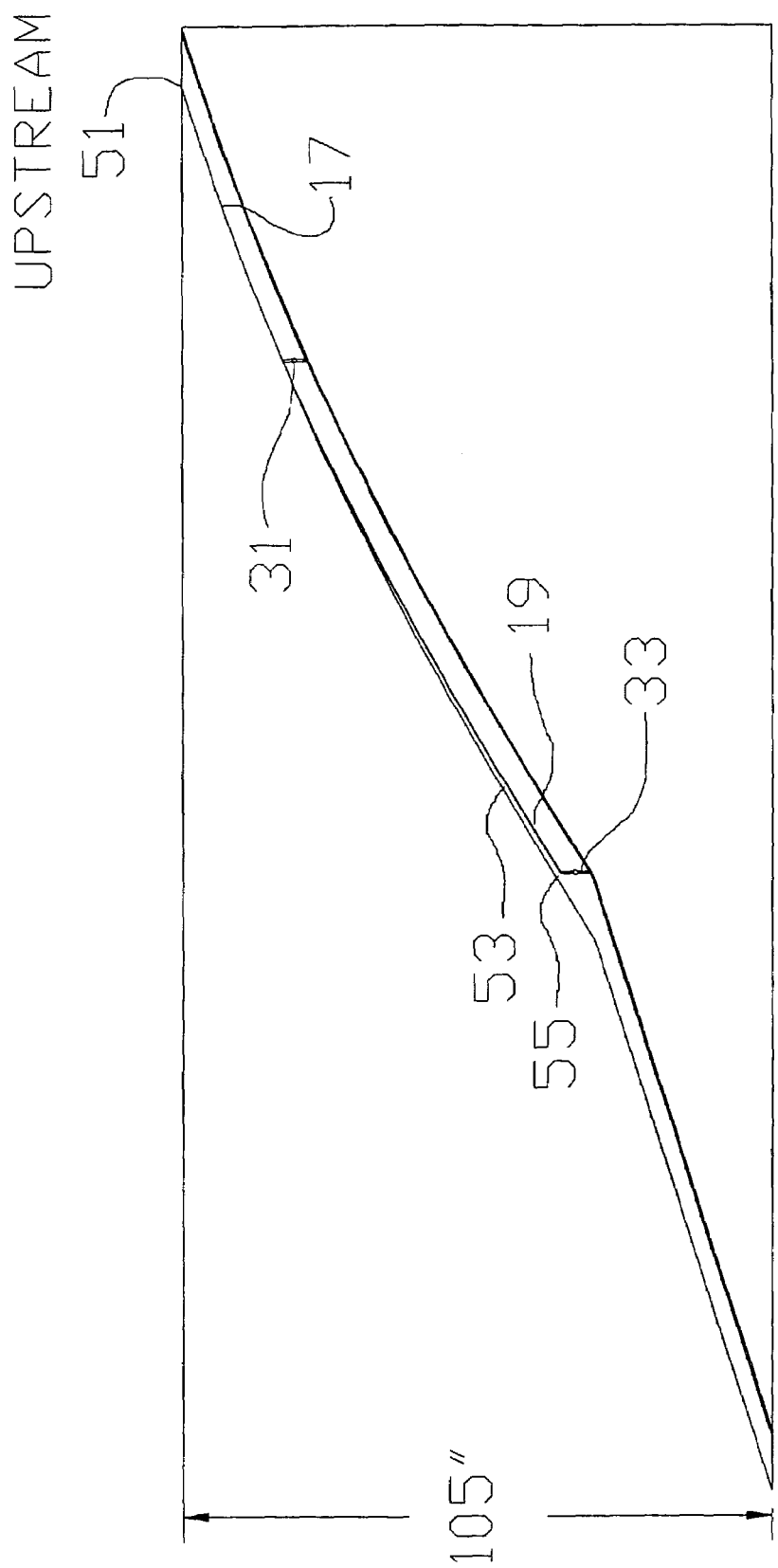

PLASTICS SCREW WITH BARRIER MEMBERS

BACKGROUND OF THE INVENTION

1. Field of the Invention

The present invention relates to improvements in the design of screws employed in the plastics processing industry to melt and convey plastic for extrusion processes.

2. Summary of Prior Art

Plastic or polymer materials are prepared for injection or extrusion by melting and mixing of plastic or polymer material (usually initially in pellet or powder form) and then conveying the melted and mixed material at pressure for either injection into a mold or for extrusion processes. Typically, this is accomplished by a "flighted" screw rotating in a heated barrel, through which the plastic or resin material passes en route to the mold or extrusion apparatus. The rotation of the screw and action of the flights upon the plastic pellets, combined with heat from the barrel, melt, mix and convey the plastic for injection or extrusion. Accordingly, screws are generally divided into "feed" sections (where the unmelted plastic or resin pellets enter the barrel), "melt" sections (where melting of the pellets takes place), and "metering" sections (where the quantity of melted plastic is delivered to the mold or extrusion apparatus.

Generally speaking, extrusion is the more critical process because uniformity of the melted plastic material and consistent delivery rates to the extrusion apparatus are essential to quality control in the extrusion process. In the plastics industry, extruding plastic resins efficiently is critical to the product quality, productivity, and energy efficiency. Achieving efficiencies that are closer to enthalpy or greater pounds (of plastic or resin) per hour per horsepower (power used in the extrusion process) improves all aspects of extruding resins. Accordingly, much design effort has been expended to develop optimum screw designs to accomplish these functions in an efficient and effective manner.

In the prior art, starting with Maillefer (U.S. Pat. No. 3,358,327), screw designs had an auxiliary or "barrier" flight that emulates the progression of melting in a conventional "square pitch" screw design (in which the pitch between successive turns of the flight is the same as the diameter of the shaft). In a conventional design, the solids bed (unmelted pellets or powder) decreases in width and the melt pool (molten plastic) increases in width along the length of the screw. In Maillefer, a second or barrier flight that starts on the leading side and (due to an elongated lead) catches up to the trailing side of the main flight in a predetermined distance. This creates primary and auxiliary "channels" between the flights that separates the solids from the melt and simulates the progression of melting in a conventional screw design. This narrowing of the primary channel decreases the solids bed width and therefore reduces the effective melting area.

Wheeler (U.S. Pat. No. 4,341,474) mistakenly decreases the primary channel width and increases the auxiliary channel width, thereby sacrificing melting efficiency for melt-conveying efficiency. The premise was to decrease the potential for material hang-up. Because the pressure established for melting is more than sufficient to deliver the melt to the metering section, this premise is invalid. In some designs that did not have an increased barrier lead, the primary channel width is reduced to allow for the auxiliary channel. (Shippers, U.S. Pat. No. 3,701,512).

The screw lead plays an important role in the available melting area. A longer lead provides greater melting area due to fewer flights and thus contribute to melting efficiency. Screws with flights having longer leads have the ability to convey higher viscosity resins with greater efficiency than lower viscosity resins. Melting efficiency is also conveying inefficiency. Inefficiency in conveying encourages melting as the downstream force component is reduced and the rotational force component is increased, forcing resin to transfer from the primary channel into the auxiliary channel by crossing the barrier flight. In the feed and metering sections, generally square pitch is the most efficient for conveying and pressure development. In the melting or transition section, conveying is determined by the rate of melting and the pressure development capabilities of the feed section. Therefore, choice of the correct lead plays an important role in melting efficiency.

The angle of the primary channel established by the feed depth and the end depth of the primary channel also are important to the melting efficiency. In the prior art, the primary channel tapered to a minimum depth. This was intended again to emulate a conventional design, where the solids bed decreases in width and the melt pool increases in width and the melting is ideally completed at the end of the transition or melting section. While this type of melting is necessary in a conventional design, in a barrier design, separation of the melt from the solids is the object. It is not necessary or desirable to complete the melting at the end of the primary channel. It is desirable to have a controlled amount of solids at the end of the primary channel that maximizes the melting area and allows for a controlled amount of solids to enter the metering section. This increases the viscosity for greater pressure generation in the metering section.

Pressure development in the feed section is critical to melting performance because the proper compacting of the solids bed evacuates the air in the pellet or powder feed. Increasing the density of the solids bed provides the maximum heat transfer and therefore maximum rate of melting. Computer simulations provide valuable information on solids conveying and pressure development, but the accuracy is lacking.

Maximum torque in a barrier screw design normally corresponds to the maximum rate of conveying. If the solids bed is not fully compacted, maximum rate will not be achieved. Also if the screw is not capable of developing the pressure required downstream, conveying will be diminished until the viscosity is lowered to the level that the pressure development is adequate. This condition is better known as surging or unstable operation and poses a serious problem to quality control and process efficiency in extrusion operations.

A need exists, therefore, for screw designs that achieve a more optimal combination of melting, mixing, and conveying efficiency, thereby improving the overall efficiency of the extrusion process.

SUMMARY OF THE INVENTION

It is a general object of the present invention to provide an improved design for a screw for use in processing plastic materials, primarily for extrusion.

This and other objects of the present invention are achieved by providing a screw for rotation in a containment barrel, the screw comprising a shaft having an upstream end and a downstream end At least one flight is secured to the surface of the shaft and extends helically in successive turns around the circumference of the shaft.

An upstream barrier member extends radially from the surface of the shaft and generally transversely between successive turns of the flight. The upstream barrier is disposed proximal the upstream end of the shaft. A downstream barrier member extends radially from the surface of the shaft and generally transversely between successive turns of the flight. The downstream barrier is disposed proximal the downstream end of the shaft.

According to the preferred embodiment of the present invention, both the upstream and downstream barrier members are removeable and can be replaced to adapt the screw to different resins or plastics.

According to the preferred embodiment of the present invention, the upstream barrier is disposed between the feed and melting sections of the screw and the downstream barrier is disposed between the melting and metering sections of the screw. A secondary or barrier flight is provided in addition to the primary flight. Both the primary and barrier flights have varying pitch along the length of the screw.

According to the preferred embodiment of the invention, a second or auxiliary or barrier flight is provided in addition to the primary flight. Both flights have leads that vary along the length of the screw such that the width of at least the primary channel between the primary and secondary flights increases in the melting section.

Other objects, features and advantages of the present invention will be apparent with reference to the drawings and detailed description of the invention, which follow.

BRIEF DESCRIPTION OF THE DRAWINGS

FIG. 1 is an elevation view of the screw according to the present invention.

FIG. 2 is a plan view of a barrier member according to the present invention.

FIG. 3 is an elevation view of the barrier member of FIG. 3.

FIG. 4 is a section view of the screw of FIG. 1 illustrating the recess or receptacle for the barrier member of FIGS. 2 and 3.

FIG. 5 is a schematic view showing the dimensions of the primary and secondary or barrier flights of the screw of FIG. 1.

DETAILED DESCRIPTION OF THE INVENTION

Figure 6B:
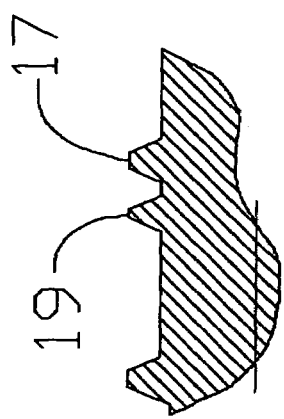
FIGS. 6A, 6B, and 6C are fragmentary section views of a portion of the screw of FIG. 1 illustrating the width of the primary and auxiliary channels at different points along the length of the screw.

Referring now to the drawings, FIG. 1 depicts a screw 11 according to the present invention. Screw 11 comprises a shaft which has an upstream end 13 and a downstream end 15. A primary flight 17 extends helically about the circumference of the shaft in successive turns along its length from the upstream 13 to the downstream end 15. A secondary or barrier flight 19 begins downstream on the screw to create a second or auxiliary channel to assist in separating the melt or molten pellets from the still-solid pellets (see FIG. 5).

The flights and screw are generally divided into three sections intermediate the ends. The first section is the feed section 21 and begins at the upstream end 13. Feed section 21 corresponds to the portion of the screw where unmelted plastic or resin pellets or powder are fed into the screw (which rotates in a containment barrel that is not shown). In the middle or intermediate portion of the screw, there is a melting or transition section 23 in which the plastic or resin pellets or powder are melted and mixed together. Near the downstream end, there is a metering section 25, where pressure is developed to deliver the melted plastic to the mold or extruder.

At the beginning (upstream end) of melting section 23, a dam or barrier member 31 extends generally transversely across the channel defined between successive turns of the flights. Dam or barrier member 31 is removable and designed to be replaced with other dams or barriers of differing height (measured as the extension of the dam radially from the circumferential surface of the screw). Varying dam height either increases or decreases the pressure upstream of dam 31, thereby providing the ability to control and optimize the compacting of the solids bed for the various types of plastic resins and their densities.

At the downstream end of melting section 23 (prior to or at the commencement of the metering section 25) another, second removable dam or barrier 33 is disposed in the channel so that it can be replaced with a dam of different height. Varying dam height at this location again either increases or decreases the pressure upstream of dam 33, thereby providing the ability to control and optimize the pressure or shear stress applied to the solids remaining in the melt as it enters the metering section. The dam height selected also determines the amount of solids entering the metering section, thereby providing the ability to control melt temperature and quality.

FIGS. 2, 3, and 4 illustrate the dam barrier member itself and the receptacle or recess formed in the screw to receive it. As is shown, barrier member 31 is rectangular in cross-section, with radiused or rounded ends to avoid excessive stagnation as material flows around dam 31. A counterbored hole 35 is provided to receive a screw (not shown) that removeably secures barrier 31 in a correspondingly shaped recess 37 in screw 11 (FIG. 4). Recess 37 is bored and tapped 39 to receive the screw. By altering the height of barriers 31, 33, the level of obstruction of the channel between adjacent flight turns can be varied, thus varying the pressure developed upstream of the barrier. Placing dams or barriers at both ends of the melt section provides increased control of pressure developed there.

The design of the screw and flights with which the dams or barriers are used is of importance in optimizing the characteristics of the screw. FIG. 5 schematically illustrates the flights on a screw according to the present invention in a plan or "unwound" view (as if the helical flights are unwound from the screw but retain their original dimensions). For a 3.50 inch diameter 30:1 l/d ratio extruder screw (overall flighted length of 105 inches), the primary lead at the start of the primary flight 17 is 3.500 inch. This lead constantly changes from 3.500 to 6.913 inch in 70 inches along the length of the screw. The channel width (between turns of the primary flight) changes from 3.022 (point 51) to 4.320 inch with a 0.313 inch flight width.

At 17.5 inches downstream along the length of the screw (corresponding approximately with the beginning of the melting section and with the location of upstream dam 31), the secondary or barrier (sometimes referred to as auxiliary) flight 19 starts on the forward or downstream side of the primary flight with a 4.710 inch lead and constantly changes to a 6.809 inch lead in 52.5 inches along the length of the screw. The width of the auxiliary channel 53 (between adjacent turns of the primary and auxiliary flights) is 1.099 inch with a 0.125 barrier flight width. At 52.5 inches (point 55) along the length of the screw (corresponding approximately to the end of the melting section and the location of downstream dam 33), the barrier flight 19 ends and the metering section returns to the original 3.50 inch lead and continues to the end of the screw.

Figure 6A:
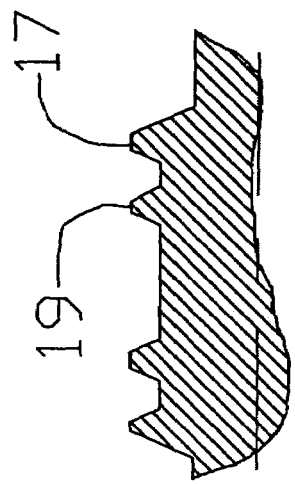
Figure 6C:
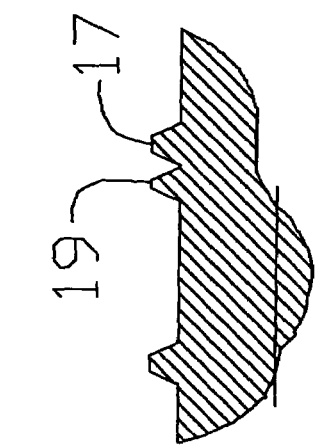

In the present invention, unlike the prior art, the channel widths (both primary and auxiliary) are constantly increasing through the feed and melting sections along the length of the screw. This increases the melting capacity of the screw because the primary channel is exposing a larger area of resin to the heated wall of the containment barrel. The dams or barriers provide a means for controlling pressure in the melt upstream of each barrier. FIGS. 6A, 6B, and 6C are fragmentary section views showing the increasing width of the primary channel at the beginning, middle, and end of melting section 23, as described above and shown in FIG. 5.

The invention has been described with reference to preferred embodiments thereof, it is thus not limited, but is susceptible to variation and modification without departing from the scope and spirit of the invention.

I claim:

1. An improved screw of the type that rotates within a heated containment barrel for conveying and melting plastic material, the screw comprising:
    a shaft having an upstream end and a downstream end;
    a primary flight secured to the surface of the shaft and extending helically in successive turns around the circumference of the shaft;
    a secondary flight secured to the surface of the shaft downstream of the primary flight, wherein a primary channel is defined between the primary flight and secondary flight;
    the primary and secondary flights defining a feed section at the upstream end of the shaft, a metering section at the downstream end of the shaft, and a melting section intermediate the feed and metering sections;
    each of the primary and secondary flights having a lead that varies along the length of the screw and the leads being selected so that the primary channel increases in width through at least the melting section.

2. The apparatus according to claim 1, further comprising:
    a first barrier member extending radially from the surface of the shaft and generally transversely to the primary and secondary flights proximal the upstream end of the shaft.

3. The apparatus according to claim 2, further comprising:
    a second barrier member extending radially from the surface of the shaft and generally transversely to the flight, the second barrier disposed between turns of the flight proximal the downstream end of the shaft.

4. The apparatus according to claim 3, wherein the barrier members are removable.

5. The apparatus according to claim 2, wherein the barrier member is removable.

6. An improved screw of the type that rotates within a heated containment barrel for conveying and melting plastic material, the screw comprising:
    a shaft having an upstream end and a downstream end;
    a primary flight secured to the surface of the shaft and extending helically in successive turns around the circumference of the shaft;
    a secondary flight secured to the surface of the shaft downstream of the primary flight, wherein a primary channel is defined between the primary flight and secondary flight;
    the primary and secondary flights defining a feed section at the upstream end of the shaft, a metering section at the downstream end of the shaft, and a melting section intermediate the feed and metering sections;
    a first barrier member extending radially from the surface of the shaft and generally transversely to the primary and secondary flights, the first barrier member being disposed in the primary channel between the feed and melting sections; and
    each of the primary and secondary flights having a lead that varies along the length of the screw and the leads being selected so that the primary channel increases in width through at least the melting section.

7. The apparatus according to claim 6, wherein the first barrier member is removable.

8. The apparatus according to claim 6, further comprising:
    a second barrier member extending radially from the surface of the shaft and generally transversely to the flight, the second barrier disposed in the primary channel between the melting and metering sections.

9. An improved screw of the type that rotates within a heated containment barrel for conveying and melting plastic material, the screw comprising:
    a shaft having an upstream end and a downstream end;
    a primary flight secured to the surface of the shaft and extending helically in successive turns around the circumference of the shaft;
    a secondary flight secured to the surface of the shaft downstream of the primary flight, wherein a primary channel is defined between the primary flight and secondary flight;
    the primary and secondary flights defining a feed section at the upstream end of the shaft, a metering section at the downstream end of the shaft, and a melting section intermediate the feed and metering sections;
    a first barrier member extending radially from the surface of the shaft and generally transversely to the primary and secondary flights, the first barrier member being disposed in the primary channel between the feed and melting sections;
    a second barrier member extending radially from the surface of the shaft and generally transversely to the flight, the second barrier disposed in the primary channel between the melting and metering sections and
    each of the primary and secondary flights having a lead that varies along the length of the screw and the leads being selected so that the primary channel increases in width through at least the melting section.

10. The apparatus according to claim 9, wherein each barrier member is removable.

* * * * *